(No Model.) 2 Sheets—Sheet 1.

M. SEIBERLING.
GLASS MELTING FURNACE.

No. 520,835. Patented June 5, 1894.

Witnesses:
Harry T. Rohrer
Wm. E. Dye

Inventor:
Monroe Seiberling
By F. W. Ritter Jr.
Attys (No Model.) 2 Sheets—Sheet 2.
M. SEIBERLING.
GLASS MELTING FURNACE.
No. 520,835. Patented June 5, 1894.
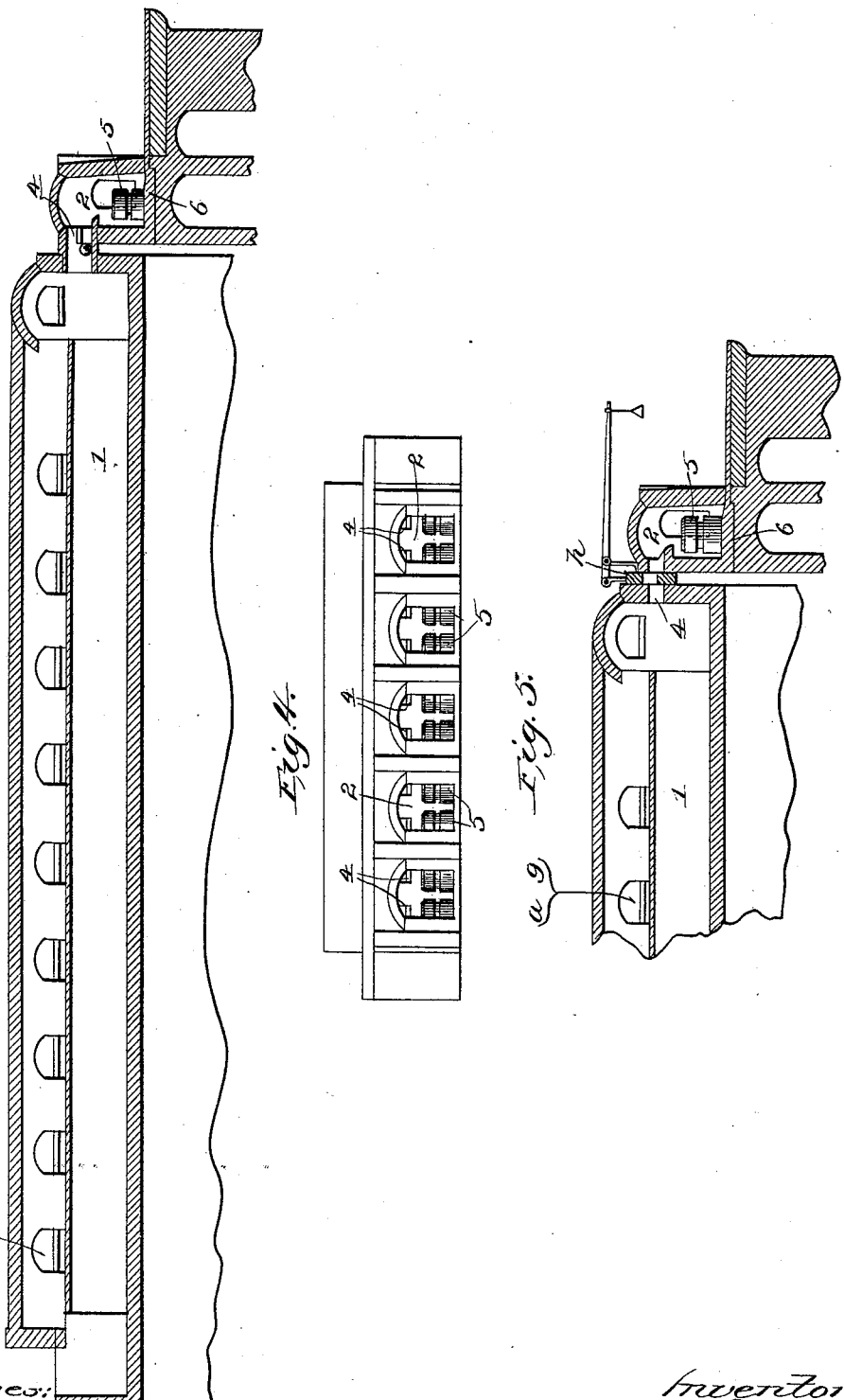

UNITED STATES PATENT OFFICE.

MONROE SEIBERLING, OF KOKOMO, INDIANA.

GLASS-MELTING FURNACE.

SPECIFICATION forming part of Letters Patent No. 520,835, dated June 5, 1894.

Application filed August 29, 1893. Serial No. 484,340. (No model.)

*To all whom it may concern:*

Be it known that I, MONROE SEIBERLING, a citizen of the United States, residing at Kokomo, in the county of Howard, State of Indiana, have invented certain new and useful Improvements in Glass-Melting Furnaces; and I hereby declare the following to be a full, clear, and exact description of the same, reference being had to the accompanying drawings, in which—

Figure 1:
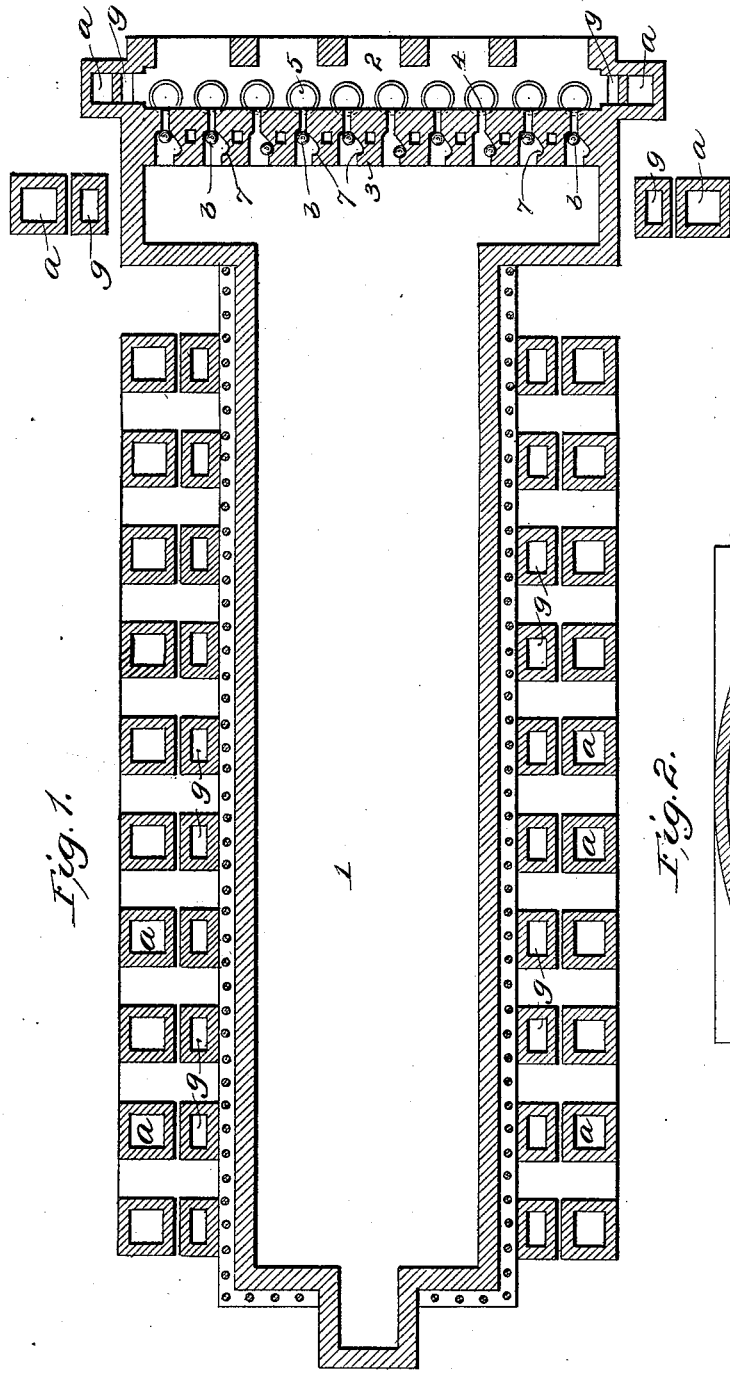
Figure 2:
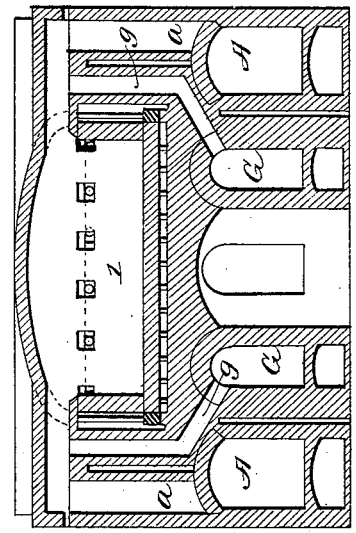

Figure 1 is a horizontal sectional view of a combined tank and pot-furnace embodying my invention. Fig. 2 is a vertical transverse sectional view looking from the rear, showing the air and gas passages and regenerators below the tank and pots, and the pierced wall which separates the pot and tank chambers. Fig. 3 is a longitudinal vertical section of the tank and pot chamber, the regenerator being omitted. Fig. 4 is a front elevation of the pot chamber, or pot furnace. Fig. 5 is a vertical longitudinal section of portions of the tank and pot furnace with communicating passages leading from one to the other, and a gate valve in lieu of a ball valve.

Like symbols refer to like parts wherever they occur.

My present invention relates generally to the melting and fining of glass, but is especially directed to the preparation of the metal for plate-glass manufacture, and has for its object the continuous melting and fining of the metal without exposure previous to casting, and with a very material decrease of the time and labor required.

In the manufacture of plate-glass, one of two methods is commonly followed, in both of which pots alone are employed. By one method, the glass is melted in one set of pots and then transferred to casting cisterns "cuvettes," and by the other method the metal is cast from the pots in which it is both melted and fined. For the first named method tank melting has been substituted, the metal being transferred by suitable means from the tank to the casting pots, in which it is fined in a separate pot furnace previous to casting. All of the above recited methods, except the last, require twenty four (24) hours to melt and fine the metal; all cause more or less exposure of the metal and pots to cold air or change of temperature, which induces the formation of bubbles in the glass and tends to the rapid destruction and loss of pots; and all involve much heavy labor.

To avoid the several objections specified and obtain a continuous melting and fining of the glass-metal, I so combine a tank and a pot furnace arranged in juxtaposition on substantially the same plane and separated by an intervening wall having valved metal passages, that the melted metal may be drawn at will, from the tank to the pots without exposure to cold air or change of temperature, whereby any number of pots can be filled and cast daily, or the same pot can be filled and cast any number of times per day, dependent only on the capacity of the tank, and said combination, or its equivalent, generally stated, embodies the main feature of my invention.

There are other, minor features of invention, all as will hereinafter more fully appear.

I will now proceed to describe my invention more fully, so that others skilled in the art to which it appertains, may apply the same.

In the drawings, 1 indicates a tank, and 2 a pot-furnace, arranged in juxtaposition thereto or substantially as a single structure separated by a wall 3, through which, below the top of tank, are ports or passages 4, opening into the pot furnace 2 at a point or points which will permit them to deliver into pots 5 contained in the pot-chamber, or pot furnace. The pot furnace has the usual openings for withdrawing the pots when casting. The bench 6 of the pot-furnace and the bottom of the tank 1, are preferably on substantially the same plane, and beneath both are the regenerators A, G, (when regenerators are used) from which air and gas flues $a$, $g$, lead to the tank and pot chamber or pot furnace, respectively. The passages 4 which connect the tank 1, and the pot furnace 2, will correspond in number with the number of pots which the bench 6 will accommodate (in the present instance 10) and are preferably so located and proportioned as to do double duty, first as flues which permit an equalizing of temperature between the tank and pot furnace, and second, as a passage for the molten glass from the tank to the pots— for which purposes they should be located partly above and partly below the metal level of the tank—though, if preferred, two passages one below and the other above the metal level, may be employed without departing from the spirit of my invention. Each of said passages is also provided with a valve to control and arrest the flow of metal from the tank to the pots 5, which valve may be of any well known form, as for instance, the gate valve $h$, shown in Fig. 5,—but is preferably a ball valve $b$—(see Fig. 1) in which case the passage 4 will be formed with a recess or side pocket 7 into which the ball may be forced by the introduction into passage 4 of an iron bar or rod, or other suitable means, to open the passage and allow the pot 5 to fill from the tank 1. The ball valve being at all times within the molten glass will retain its temperature and not become incrusted with glass, and when released will automatically close the passage—or can be readily made to close the passage—by proper use of said iron bar or rod.

The construction of the melting and fining furnace being substantially of the character hereinbefore specified, the tank metal will be produced and maintained in the usual manner, the pots wherein the metal is fined being charged from time to time, as required, through the valved passages which connect the tank and pot-furnace without change of temperature or exposure of the metal to air, except at the time of casting, so that the operation is practically a continuous one, maintained under an even temperature and without exposure to cold air from the time of the heating of the first batch to the casting of the final plate, with the elimination of much labor or handling of pots now required—great reduction in time required for melting and fining a given amount of glass-metal, a large saving in pots, and a more uniform and better quality of plate-glass.

I have for the purposes of this specification referred to gas heating and regenerators—but as the same form no part of my present invention, any other method or means of heating the tank and pot furnaces may be substituted without departing from the spirit or scope of my invention.

Having thus described my invention, what I claim, and desire to secure by Letters Patent, is—

1. The combination in a glass melting furnace, of a tank and a pot furnace arranged in juxtaposition on substantially the same plane, and an intervening wall having metal passages provided with valves; substantially as and for the purposes specified.

2. The combination in a glass melting furnace, of a tank and a pot furnace arranged in juxtaposition on substantially the same plane, an intervening wall having metal passages provided with valves below the metal level of the tank, passages above the metal level of said tank which passages connect the tank and pot furnaces, and means for heating the tank and pot chambers separately; substantially as and for the purposes specified.

3. The combination with a tank, of a pot furnace arranged in juxtaposition and with its bench transversely of and on substantially the level of the tank, an intervening perforated wall common to both tank and pot furnace, and suitable valves for the perforations or passages in said intervening wall; substantially as and for the purposes specified.

4. The combination in a glass melting furnace of a tank, a pot-furnace, a recessed metal passage which connects the tank with the pot-furnace, and a ball valve arranged in said metal passage; substantially as and for the purposes specified.

In testimony whereof I affix my signature, in presence of two witnesses, this 14th day of August, 1893.

MONROE SEIBERLING.

Witnesses:
 JOHN WM. PERTZ,
 A. G. SEIBERLING.